United States Patent
Slettevoll

(10) Patent No.: US 8,648,553 B2
(45) Date of Patent: Feb. 11, 2014

(54) CONTROL OF HEAVY MACHINES

(75) Inventor: Hallvard Slettevoll, Gjerdsvika (NO)

(73) Assignee: In Motion AS, Gjerdsvika (NO)

( * ) Notice: Subject to any disclaimer, the term of this patent is extended or adjusted under 35 U.S.C. 154(b) by 682 days.

(21) Appl. No.: 12/738,961

(22) PCT Filed: Oct. 22, 2008

(86) PCT No.: PCT/NO2008/000373
§ 371 (c)(1),
(2), (4) Date: Apr. 30, 2010

(87) PCT Pub. No.: WO2009/054727
PCT Pub. Date: Apr. 30, 2009

(65) Prior Publication Data
US 2010/0219777 A1    Sep. 2, 2010

(30) Foreign Application Priority Data
Oct. 22, 2007    (NO) .................................. 20075383

(51) Int. Cl.
*H02P 5/00* (2006.01)
*H02K 7/10* (2006.01)

(52) U.S. Cl.
USPC .................................. 318/66; 318/8; 318/11

(58) Field of Classification Search
USPC ............................................. 318/8, 11, 66
See application file for complete search history.

(56) References Cited

U.S. PATENT DOCUMENTS

| | | | |
|---|---|---|---|
| 4,525,655 A | 6/1985 | Walker | |
| 5,961,558 A | 10/1999 | Kvamsdal | |
| 6,297,610 B1 | 10/2001 | Bauer et al. | |
| 6,320,273 B1 | 11/2001 | Nemec | |
| 7,459,890 B2 * | 12/2008 | Baratto et al. | 322/44 |
| 7,462,946 B2 * | 12/2008 | Wobben | 290/44 |
| 2005/0106953 A1 | 5/2005 | Andersen et al. | |
| 2006/0207811 A1 * | 9/2006 | Miyao | 180/65.2 |
| 2008/0018112 A1 * | 1/2008 | Kleen | 290/40 B |
| 2008/0054643 A1 * | 3/2008 | Nitzpon et al. | 290/44 |

FOREIGN PATENT DOCUMENTS

| | | |
|---|---|---|
| EP | 1561945 A2 | 8/2005 |
| GB | 101809 A | 1/1917 |
| GB | 539203 A | 9/1941 |
| WO | WO-2004/092580 A1 | 10/2004 |

OTHER PUBLICATIONS

Gusia, Sorin, "International Search Report", for PCT/NO2008/000373 as mailed Aug. 21, 2009, 3 pages.

* cited by examiner

*Primary Examiner* — Lincoln Donovan
*Assistant Examiner* — Gabriel Agared
(74) *Attorney, Agent, or Firm* — Winstead PC

(57) ABSTRACT

The present invention relates to a system for controlling rotational speed on a rotating process machine (P), which for example is a turbine or a propeller, where the rotating process machine (P) is connected to at least one motor (M1) and arranged to rotate with a given rotational speed given by the motor (M1), the motor (M1) is connected to a control system (C) and the rotational speed of the motor (M1) is arranged to be controlled by a control system (C). The rotating process machine (P) comprises a load control (PC) arranged to be adaptable, the control system (C) is connected to the rotating process machine (P). With the invention, one achieves soft transitions between several selectable rotational speeds and lower energy consumption by step by step adjusting the size and the rotational speed of the motor (M1) to varying energy requirement.

19 Claims, 8 Drawing Sheets

CONTROL OF HEAVY MACHINES

The invention relates to a system for control of rotational speed and power on heavy machines, for examples on machines with powers above 100 kW.

Environment and climate are important aspects today, which are being considered in most areas. This is especially important within i.a. industry and transport, and then by considering reduction of consumption of electrical energy, fuel and emission of environmentally dangerous exhausts. The present invention contributes to effective utilization of energy in large machines and operation of machines in an energy efficient way by using components and composition of these so that start, stop and operation of machines takes place by effective use of energy, which again reduces the waste of environmentally dangerous exhausts.

Several existing systems for control of rotational speed and power for heavy machines being used in for example ships have zero or maximum rotational speed (100%), in addition to mechanical load control. This makes the motors rotate with maximum rotational speed even though the ship is standing still, which gives a mechanical loss caused by the mechanical load system. In addition, noise is a problem with such a form of machine control.

There are often problems with the inrush current in existing electromechanical systems. When an electric motor is connected with direct start, it will have an inrush course drawing ten times the so called nominal current, i.e. the motor requires very much current to be able to perform this fast and large acceleration. Dependent on the motor load, this situation can last for from for example half a second to some seconds. This powerful acceleration in short time requires a lot of available power which can be saved if the acceleration is done more controlled.

In the patent publication U.S. Pat. No. 4,525,655 it is described an electric motor drive system with two electric motors, one small and one large, being mechanically coupled to a common shaft through a complex epicyclical gear system. The small motor is used to accelerate the large motor at start of the process, so that large power consumption is avoided at start-up of the motor. A tachometer sends a signal to a comparison circuit controlling the power delivered to the two motors. When the speed of both motors is equal, a control unit will balance the power delivered to both motors. One of the motors has preferably twice the power of the other.

In the patent publication GB 101,809 it is described a system for starting a synchronous machine by means of a pony motor. A mechanical switch turns off the pony motor when it has helped the synchronous motor to reach desired speed. This publication is dated 1916, and shows that the principle of a pony motor is a principle being known for a long time.

The patent publication GB 539, 203 is related to an invention concerning drivers of two electric motors (AC or DC), one small and one large, for use in printing presses or other machines. The two motors are connected together by a shaft and an electromagnetic clutch. A break is used to break the motors. Reversion switches are used to reverse the motors. The small motor starts the printing press by means of the clutch, and then the large motor takes over the operation of the printing press and disconnects the small motor by means of the clutch.

The patent publication U.S. Pat. No. 6,297,610 B1 describes a system that can be used to control a plurality of electric units.

Thus, it is a need for an electric drive system reducing or removing the mechanical load loss when the machine is not going to perform any work, and control of motors being simple, cost effective and maintenance-free. The problem with a high noise level when a motor is running idle is preferred to be reduced. The same is valid for the elimination of electric disturbances, which is a problem in many alternative types of electric drive systems. It is also a need for a system where the machines accelerates softly between various rotational speeds at the same time as the machines is provided with only the necessary amount of power needed for the acceleration.

The present invention solves the above problems by providing a system for stepless regulation of rotational speed and power on heavy machines having a compact and simple design, few complex components, does not generate any electric disturbance and is cost effective compared to existing systems. Such a system comprises a computerized control system, electric control boards and motors connected to a process machine to be controlled. The system solving the above mentioned problems can be used to, for example, control of ventilators, pumps or compressors in processing plants, control of propellers with adjustable wings on air planes or ships, wind turbines or hydro power generators. The purpose of the invention stated above is achieved by providing a system as mentioned above and characterized as specified in the appended claims.

Thus, the present invention provides a system for control of rotational speed and power on a rotating process machine, such as for example a turbine or a propeller, where the rotating process machine is connected to at least one motor or generator and arranged to rotate with a rotational speed given by the motor. The motor or generator is connected to a control system, and the rotational speed of the motor or generator is arranged to be controlled by a control system. The rotating process machine comprises a load control arranged to be adaptable. The control system is connected to the rotating process machine and is arranged to control the load control in the rotating process machine. Thus, with the invention one achieves soft transitions between several selectable rotational speeds and lower energy consumption by step by step adjusting the size and the rotational speed of the motor to varying power requirements.

In a preferred embodiment of the system according to the present invention, the control system is connected to and arranged to control a first control board, and the first control board is connected to and arranged to control the motor.

In yet a preferred embodiment of the system according to the present invention, the first control board comprises at least one set of thyristors and at least one sensor, for example a current sensor, with accompanying control electronics. The thyristors makes it possible to control the inrush current and start-up torque so that the system is suitable to be used in plants where there is limited available electric power.

In a further preferred embodiment of the system according to the present invention, the control board also comprises at least two contactors so that the motor or generators get a signal regarding which rotational speed they shall have. The contactors can handle a relatively large motor requiring large power.

In yet a preferred embodiment of the system according to the present invention, the control board comprises at least two sets of thyristors and at least two sensors. The thyristors makes it possible to control the inrush current and inrush torque of the motor or generator so that the system is suited to be used in plants where it is limited available electric power.

In another preferred embodiment of the system according to the invention, the control board comprises at least one frequency converter and at least one sensor so that the rotational speed of the motor or generator can be stepless controlled.

In yet a preferred embodiment of the system according to the present invention, the system comprises at least one first motor or generator and at least one second motor or generator connected via a shaft. The second motor or generator is arranged to help the first motor to achieve high rotational speeds, such that the start load on the first motor or generator does not become that large and such that the acceleration takes place soft and controlled.

In still another embodiment of the system according to the present invention, the first motor or generator and the second motor or generator are connected to and arranged to be controlled by first and second control board, respectively.

In yet another preferred embodiment of the system according to the invention, the first motor or generator has at least one first speed and the second motor or generator has at least one second speed.

In still yet another embodiment of the system according to the present invention, the first motor or generator has a power between three and ten times larger than the power of the second motor or generator.

In yet a preferred embodiment of the system according to the invention, the thyristors are 3-phase anti-parallel connected thyristors or equivalent power semi-conductors.

In still a preferred embodiment of the system according to the present invention, the system is connected to an external power supply with the frequency 50 Hz.

In yet a preferred embodiment of the system according to the invention, the rotating process machine has a power larger than for example 100 kW.

In still another preferred embodiment of the system according to the invention, the control system is connected to and arranged to control at least one clutch to connect a load to and from the motor.

In yet a preferred embodiment of the system according to the invention, the rotating process machine is connected to a gear, and the gear is connected to the motor or generator. The gear makes the rotational speed between the process machine and the motor or generator adaptable.

In another embodiment of the system according to the invention, the rotating process machine is connected to a gear. The gear is connected to the first motor or generator and the second motor or generator, such that the rotational speed between a process machine and the motors or generators can be adaptable.

In still another embodiment of the system according to the present invention, a remote control system is connected to the system so that the system can transmit and receive information.

In yet another embodiment of the system according to the invention, at least the one motor or generator is connected to a non-electric motor or generator via a shaft so that the system can vary between various rotational speeds, and this non-electric motor or generator can also operate the whole system with reduced performance.

In another embodiment of the system according to the invention, the non-electric motor is operated by a non-electric power supply, for example a pressurized oil source.

In still another embodiment of the system according to the invention, the non-electric motor is connected to a rotational speed sensor so that performance and operation of the non-electric motor can be monitored and controlled.

The invention will now be described in detail with reference to the accompanying drawings illustrating the invention by means of examples.

Figure 1:
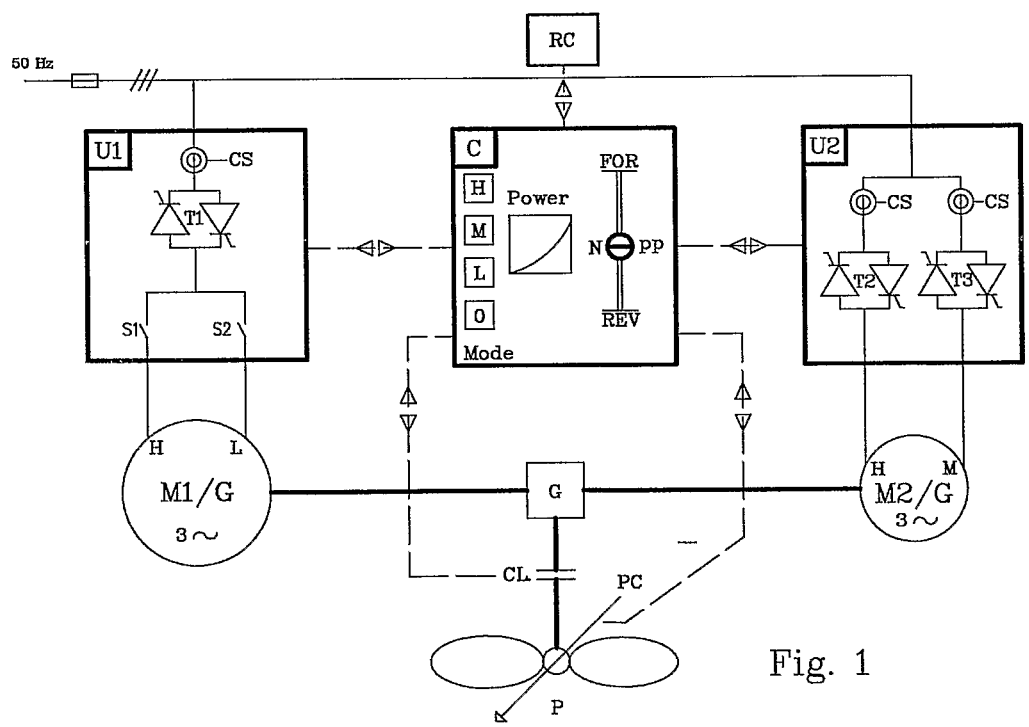
FIG. 1 is a principle drawing showing a preferred first embodiment of the system according to the present invention.

FIG. 1 shows a principle drawing for a preferred embodiment of the system according to the present invention. The system, as shown in FIG. 1, is a 3-phase alternating current system supplied with power from an external power source. The external power source will typically be of 50 Hz, but also other frequencies, such as for example 60 Hz, can be used. Pure sinusoidal shaped current is drawn directly from the grid and delivered to the system, and it is therefore not any need for, for example converters or filtering, as the system does not generate substantial electric disturbances. Several types of electric machines can operate both as motors and generators, only depending on the direction of forces working on the mechanical shaft. This is the reason why FIG. 1-FIG. 8 indicates M1/G meaning motor or generator.

The system comprises two 3-phase (3~) two-speed electromotors M1, M2, preferably asynchronous motors, mechanically connected to a gear G, and that will drive a process machine P. The first motor M1 has two rotational speeds H, L, and the second motor M2 also has two rotational speeds H, M. The first motor M1 is a large motor compared to the other motor M2, i.e. the first motor M1 has larger power than the other motor M2. For example, at 4 pole operation, the first large motor M1 has a maximum power of 1500 kW, and at 8 pole operation it will have maximum power of 400 kW. The other small motor M2 will, at 4 pole operation, have a maximum power of 200 kW, and a maximum power of 500 kW at 6 pole operation. All the above mentioned power figures have their basis in a power supply of 50 Hz, 3-phase current. If a power supply with another frequency is used, the numerical examples for maximum power above will have other values. As previously mentioned, the motors are preferably asynchronous motors, but it is also possible to use other types of motors, such as for example synchronous motors. If the use of the present invention is power generators, the motors will be generators, and then the system will deliver energy back to the grid instead of only consuming energy. Also a combination, so called motor/generator operation of the system is possible, i.e. the power flow can alternating go in both directions.

The gear G is connected between the two motors M1, M2, and gives a permanent mechanical connection of the motors M1, M2. This mechanical connection is in form of a rigid shaft. The function of the gear G is to adapt the rotational speed between the process machine P and the motors M1, M2. The system will also work without a gear G. The decision to use a gear G or not in the system is dependent on the characteristics of the process machine P.

A clutch CL is connected between the gear G and the process machine P. The clutch CL is electrically controlled, and can be disconnected when the process machine P is not in operation, but connected when the process machine shall run.

The system will also function without the clutch CL (i.e. the whole system rotates), or with several clutches CL which for example can be connected between the individual motors M1, M2 and the gear G. The number of clutches CL is a matter of evaluation where both price, service-friendliness, wear, loss (efficiency), lifetime and functionality matter.

The process machine P is a rotating machine, and can for example be a propeller on a ship or air plane, ventilator, pump or compressor in a process plant, wind turbine or hydro power generator. The process machine P has an electro mechanical/hydraulic load control/power control PC making it possible to stepless adjust the power of the process machine P by adjusting for example the angle of the blades on for example a propeller.

The electro mechanical/hydraulic load control PC is a mechanic device in the rotating machine, process machine P. The load control PC is used to adjust the power in the system, and to decide which direction the power shall have. The load control PC is activated by means of a load control lever PP connected to a computerized control system C, as shown in FIG. 1. The load control lever PP is described in more detail below. The load control PC can be of different types, such as for example pitch control, throttle control with valve (which is typical in pumps and ventilators), vane control, recycling/bypass control controlled by a valve, slide control (stepless mechanical load control of screw compressors being electro-mechanically controlled) or cylinder control controlling all cylinders on the piston machine and compressor with digital control signals deciding if the individual cylinder shall be active or passive. All these possible types of load control PC described above can basically be stepless controlled from the control system C with electric signals. The load control PC can be stepless adjusted in the area from −100% to +100%. All values in the area from −100% to +100% can in principle be used because the stepless control of the load control PC takes place in small steps of for example 0.5%, with the exception of the cylinder control which gives larger steps.

The system can be used without the load control PC, which gives a simpler and cheaper system, but also a far less flexible system. Without load control PC, the control of the step response will be rougher and one gets only stepwise load/power control of the process machine P. This can be used if there is a need for stepwise steps in the control of rotational speed and power of the process machine P. A system without load control PC is not an optimal system, but in certain cases it can be good enough. The selection between having load control PC or not is dependent on the process itself, and what is desired to achieve. A desire to change the direction of the power flow from positive power direction to negative direction on the process machine P can also be achieved by using an electro technical transformation of the windings of the electro motors M1, M2, such that the rotating direction thereby turns (not shown).

To the first motor M1, a first electric control board U1 is connected controlling the first motor M1. The first electric control board U1 comprises a sensor CS, for example a current sensor, measuring electric current and voltage, and calculates power, and provides for the current to maintain within given limits. The control board U1 also comprises a set of 3-phase anti-parallel connected thyristors T1 and two electric contactors S1, S2 controlling the rotational speeds H, L to the first motor M1. Either one of the contactors S1 is connected or the other contactor S2 is connected, or both contactors S1, S2 are disconnected. Both contactors S1, S2 must never be connected at the same time. The control board U1 also comprises a, not shown, local control unit treating the signals from the sensor CS, controlling the thyristors T1 and calculates the amount of power being disposed in the unit.

A second electric control board U2 controlling the second motor M2 is connected to the second motor M2. The second control board U2 comprises two sets of 3-phase anti-parallel connected thyristors T2, T3 controlling the rotational speeds H, M of the motor M2. Each set of thyristors T2, T3 are connected to each sensor CS. The control board U2 also comprises a, not shown, local control unit such as in the control board U1. The sensors CS and the local control unit have the same function as described for the first control board U1.

The 3-phase anti-parallel connected thyristors T1, T2, T3 can control the start-up current and start-up torque of the motors M1, M2, and are controlled from the control system C. It is well known to use thyristors to obtain soft start of motors. A person skilled in the art will understand that the thyristors T1, T2, T3 will minimize the large inrush currents and that the torque during start is minimized such that the motors M1, M2 gets a soft acceleration. This low start-up energy makes the system suitable for weak grids having limited available power, for example on ships or in geographical areas where the power grid is weak. The thyristor control has two tasks; one is to provide soft acceleration at start-up and the other is to protect the motors M1, M2 during operation and provide instantaneous disconnection at a given overload of the system. If the system is used in plants where there is no limited available power, the thyristors T1, T2, T3 can be replaced with simpler start-up systems, for example contactor, Y/D start, resistance start, transformer start or similar.

A not shown alternative is to use so called bypass of the thyristors T1, T2, T3. This comprises use of contactors in parallel to the thyristors T1, T2, T3 taking over when the thyristors T1, T2, T3 has performed their work at start-up and acceleration of the motors M1, M2, i.e. all current goes through the contactors instead of the thyristors T1, T2, T3. An advantage with this not shown alternative is that it reduces the power loss in the specific unit, but it does not change the functionality.

As shown in FIG. 1, and as described above, the two control boards U1, U2 have different configuration. The first control board U1 has only one set of anti-parallel connected thyristors T1 and two mechanical contactors S1, S2, while the other control board U2 has two sets of anti-parallel connected thyristors T2, T3. The first motor M1 is, as previously mentioned, a relatively large motor requiring a lot of power, and therefore it is most preferred to use contactors S1, S2 to control the speed, in addition to that it is a cheap solution. The other motor M2 is a relatively small motor, compared to the first motor M1, and does not require so much power that it is necessary to use contactors as in the first control board U1. It is therefore sufficient to control the speed of the other motor M2 by means of the two sets of anti-parallel connected thyristors T2, T3. The other control board U2 is therefore a pure electric control board without mechanical movable components making it simple and suitable to control the other motor M2. The control board U2 also has the advantage before the control board U1 that it temporarily can activate two speeds at the same time to give a soft transition without slip between the two speeds.

In alternative embodiments (not shown), both the motors M1, M2 are controlled by control boards of the same type as the first control board U1, both motors M1, M2 can be controlled by control boards of the same type as the second control board U2, or the first motor M1 can be controlled by a control board of the type as the second control board U2 and the second motor M2 can be controlled by a control board of the type as the first control board U1. These alternative embodiments are possible embodiments, but none of these are particular optimal combinations. The preferred and optimal embodiment is shown in FIG. 1, and is as previously mentioned that the first motor M1 is controlled by the first control board U1 and the second motor M2 is controlled by the second control board U2.

In the present invention, a control system C controls both control boards U1, U2 and the load control PC in the process machine P. The control system C comprises both a computer based control system controlling the control boards U1, U2 and the load control PC, and a user interface for the operator of the system. The interface for the operator will typically be a computer screen. The user interface comprises command buttons for selecting mode (rotational speed) 0 (zero), L (low), M (medium), H (high), a graphical indicator for power and a load control lever PP to change and control load to the process machine P. By activation of the load control lever PP, the control system C gives a command signal to the load control PC to control for example the angle of the blades on a propeller. Load can, as previously mentioned, be stepless controlled in the area −100% to +100%. The load control lever PP has three different main positions: FOR (forward), N (neutral) and REV (reverse). When the load control lever PP is in the position N, zero command is given to the load control PC, and the motors M1, M2 then runs with the selected rotational speed, but the process machine P does not perform any work. When the load control lever PP is in the position FOR, maximum positive commands given to the load control PC, and then the motors M1, M2 will run with the selected rotational speed and full forward power (full positive power). When the load control lever PP is pulled towards the position REV, the direction of power will gradually turn, and the load control PC provides maximal reversal power from the process machine P, related to the selected rotational speed. The graphical indicator Power gives a graphical display of how much power is provided to the process machine P at any time.

The commando buttons 0, L, M, H are buttons, for example on a computer screen, which an operator uses to select which mode the process machine P shall be in, i.e. which rotational speed it shall have. In FIG. 1, four different rotational speeds are shown as an example, but it is also possible to have another number of rotational speeds to choose between. However, the rotational speeds can not be any rotational speeds, as the rotational speed is determined by the pole number of the electrical machine M1, M2, and the mains frequency. If, for example, a frequency converter FC or a non-electric motor HM is used instead of thyristors T1, T2, T3 in the control boards U1, U2, one can in the area of low rotational speed supplement the regular rotational speeds with any rotational speed via the smallest of the driving motors M2. In addition, the mains frequency can be changed between 50 and 60 Hz. This will give a more floating transition between the rotational speeds 0, L, M, H and increase the flexibility in the system. Such floating frequencies are possible in closed plants, such as for example a ship. The situation when using frequency converter FC is described in more detail for FIG. 3 below.

After an operator has pushed the specific command button 0, L, M, H, a light in the button on the screen will confirm that the system has reached the selected mode (rotational speed). The command button 0 gives zero rotational speed, the command button L gives low rotational speed, the command button M gives medium rotational speed and the command button H gives high rotational speed. As shown in FIG. 1, the first motor M1 has the rotational speeds H and L, while the second motor M2 has the rotational speeds H and M. In addition, the load control lever PP is used to control power. Numerical examples of rotational speed and power at the four modes for the embodiment in FIG. 1 are shown in table 1 below. As previously mentioned, the system will typically operate with a power supply of 50 Hz, but other frequencies are also possible. Table 1 also shows power and rotational speed at a power supply of 60 Hz, but in the following, 50 Hz will be used as starting point.

TABLE 1

| Mode | 0 | L | M | H |
|---|---|---|---|---|
| Active motor (FIG. 1) | — | M1 | M2 | M1, M2 |
| Power (kW) (50 Hz) | 0 | 0-400 | 0-500 | 0-1500 |
| Rotational speed (rpm) (50 Hz) | 0 | 750 | 1000 | 1500 |
| Power (kW) (60 Hz) | 0 | 0-480 | 0-600 | 0-1800 |
| Rotational speed (rpm) (60 Hz) | 0 | 900 | 1200 | 1800 |

As shown in table 1 above, the system is turned off at mode 0, the motors M1, M2 are not rotating and do not give any power. At mode L, the first motor M1 rotates at low rotational speed (750 rpm). The power of the process machine P is then between 0 and 400 kW, dependent on the load level of the load control PC selected via the load control lever PP. At mode M, the second motor M2 rotates with medium rotational speed (1000 rpm). The power of the process machine P is then between 0 and 500 kW, dependent on the load level of the load control PC. If the selected mode is H, the first motor M1 rotates with high rotational speed H (1500 rpm). The power of the process machine P at high rotational speed H is between 0 and 1500 kW, dependent on the load level of the load control PC.

The description above only describes rotational speed and power at the various selected modes, but it is also important to describe the transitions between the different modes. If an operator has placed the system in mode 0, a lamp will turn on at the interface of the control system C to indicate that the system is in the selected mode. If the operator then pushes the command button L, then the system shall go from mode 0 to mode L. This transition from 0 to L can be called TR1. Then the first motor M1 accelerates from rotational speed 0 to rotational speed L (750 rpm) when a control signal from the control system C activates the thyristor T1 in the first control board U1, and the contactor S2. Due to the properties of the thyristor T1, which is known for a person skilled in the art, the first motor M1 will then accelerate softly with a limited start-up current until it reaches the required rotational speed L. As the two motors M1, M2 are mechanically connected via a shaft, the first motor M1 will also rotate with the rotational speed L together with the second motor M2.

In the above described transition TR1, the control system C has the possibility to reduce the need for acceleration energy, by reducing the load control PC. High acceleration energy requires a lot of produced and available energy. If sufficient available energy is not present, then it is a need to reduce the acceleration energy. This can be done in two ways. The first way provides the control system C to give a command to the load control PC to reduce the load by adjusting the load control PC towards zero. This is done by the control system C automatically and temporarily overruling the load control lever PP. The control system C gets information about available energy from a remote control system RC. The second way to reduce the need for acceleration energy involves use of the clutch CL. The control system C gives a command to the clutch CL to open, such that all loads are taken away from the machines M1, M2. After the rotational speed L is reached, the control system C can give a command to the clutch CL to connect again, and increase the load level of the load control PC to required level. By introducing a so called soft clutch, a re-connection will take place in a softer way, i.e. no immediate mechanical connection. The term soft clutch is well known for a person skilled in the art. After these operations have been performed, the system will be in mode L, the motors M1, M2 has the rotational speed L=750 rpm and the power can stepless be controlled by means of the load control PC between 0 kW and 400 kW.

If the operator activates the command button M when the system already is in mode L, the control system C disconnects the thyristor T1 and the contactor S2, and engages the thyristor T3 in the second control board U2 of the second motor M2 at the same time. In the beginning of this transition mode, called TR2, both motors M1, M2 have a low rotational speed L, for example 750 rpm, as described above. When engaging the thyristor T3, it accelerates the second motor M2 up to a rotational speed M, 1000 rpm. Accordingly, it also rotates the first motor M1 with the rotational speed M. The power of the system can then be stepless controlled by means of the load control PC between 0 kW and 500 kW provided by the motor M2. This way, a soft transition between the rotational speeds L and M is achieved.

The transition between the rotational speeds M and H takes place in a somewhat different way. The basis for this transition, called TR3, will be that the motors M1, M2 run with a rotational speed M, and that the thyristor T3 is connected, while the other thyristors T1, T2 and the contactors S1, S2 are disconnected. In the transition TR3, the second motor functions as a so called pony motor, and is an assisting motor which helps the first motor M1 to reach the high rotational speed H. When an operator activates the command button H in the control system C, the thryistor T3 is disconnected and the thyristor T2 is connected at the same time. The second motor M2 accelerates to a rotational speed H. The control system C monitors this acceleration and when it knows that the motors M1, M2 have reached the rotational speed H, it engages the thyristor T1 and the contactor S1 in the first control board U1 connected to the first motor M1. The thyristor T2 shall then in basis be disconnected, and the motor M1 is synchronized softly into the grid without any substantial start-up current. Then the motors M1, M2 run with the fixed high rotational speed H, 1500 rpm, and the system power can vary between 0 kW and 1500 kW by means of the load control PC.

The transitions from mode H to M, from H to L, from H to 0, from M to L, from M to 0, from L to 0, from 0 to M and from 0 to H are done in a corresponding way as described above, and will thus not be described in further detail.

As shown in FIG. 1, a remote control system RC is connected to the system. This remote control system RC exchanges information to and from the rest of the system, and gives information about, for example, the grid supplying energy to the rest of the system and how large capacity this grid has. Such a remote control system RC prevents the system from taking more energy from the grid than the available energy, i.e. a load or power control takes place which prevents overload in the system.

Components and functions, and alternative configurations detailed described in FIG. 1 are also valid for the embodiments shown in FIG. 2-8. Thus, only the substantial differences between the embodiment in FIG. 1 and the respectively other embodiments will be described in the following.

Figure 2:
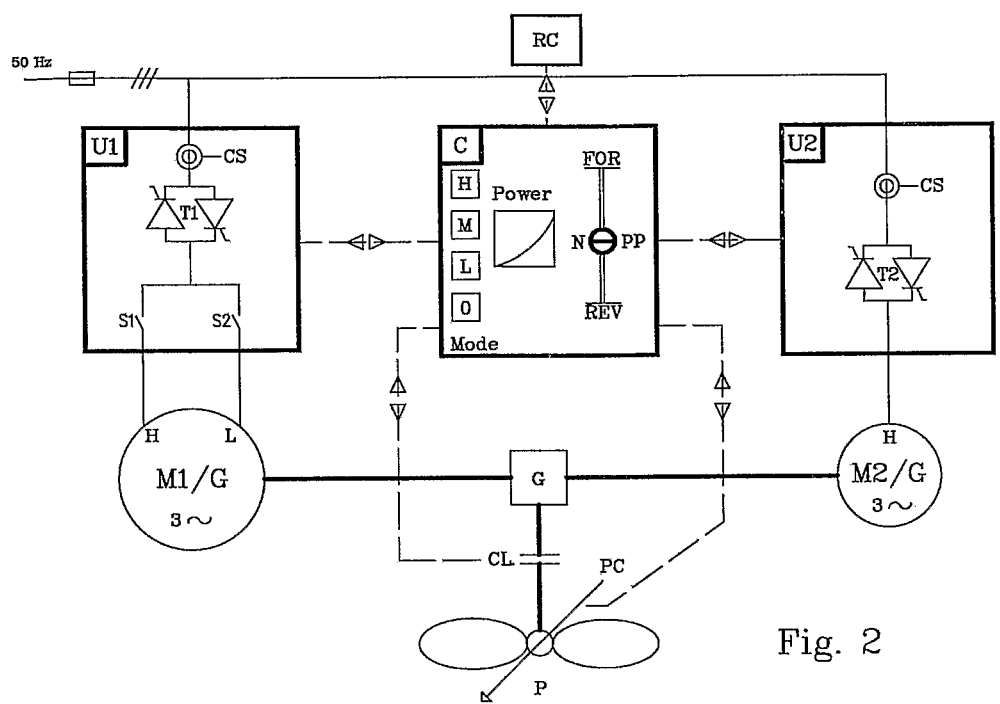
FIG. 2 is a principle drawing showing a second embodiment of the system according to the present invention.

FIG. 2 shows a second embodiment of the invention quite similar to the one shown in FIG. 1, except from the control board U2 and the rotational speeds of the motor M2. The embodiment in FIG. 2 is a simplified solution of the preferred embodiment in FIG. 1, both considering the number of components and price. The components in the system shown in FIG. 2 are the same as detailed described above for FIG. 1, and will accordingly not be further described for FIG. 2. The control board U2 controls, as in FIG. 1, the second motor M2. The control board U2 comprises a sensor CS and a set of anti-parallel connected thyristors T2 (contrary to two sets of thyristors in FIG. 1). The selection of only one set of thyristors T2 relates to the second motor M2 having only one rotational speed. The control panel C has the command buttons 0, L, M, H, and it is the command button M on the control panel C that corresponds to the rotational speed H in the motor M2. A motor M2 with only one rotational speed is a simple and cheap motor compared to the corresponding motor M2 in FIG. 1. Mode and transitions between the modes are approximately as described in FIG. 1.

Figure 3:
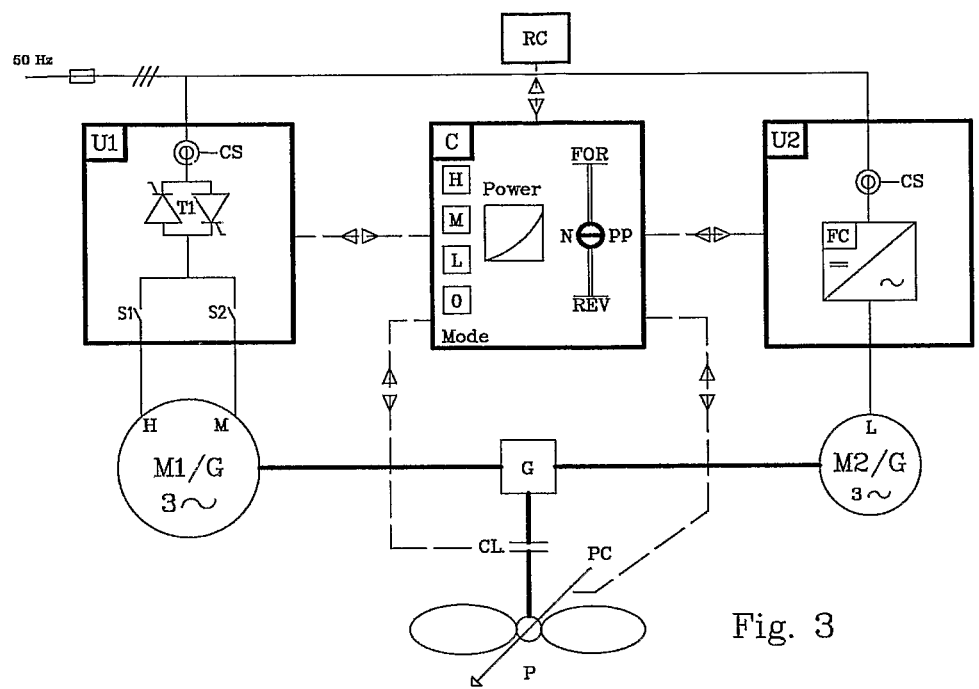
FIG. 3 is a principle drawing showing a third embodiment of the system according to the present invention.

FIG. 3 shows a third embodiment where the control board U2 and the rotational speeds of the motors M1, M2 are changed compared to FIG. 1. The control board U2 in FIG. 3 comprises a sensor CS measuring current and voltage, and calculates power. In addition to the sensor CS, the control board U2 has a frequency converter FC. The first motor M1 can run on the rotational speeds H and M, while the second motor M2 is a one-speed motor with rotational speed L. By means of the frequency converter FC, the rotational speed of the second motor M2 is stepless controlled from zero to rotational speed H. The rotational speed on the second motor M2 is remotely controlled from the control system C. Use of a frequency converter FC provides the possibility to freely regulate the rotational speed up and down, and park the motor M2 on the desired rotational speed. The frequency converter FC also contributes to accelerate the first motor M1 to the desired rotational speed when it is not loaded and controlled by its own control panel U1.

A known problem related to frequency converters is that they can create a lot of disturbance on the electric grid. This problem is solved in the present invention by using the first control board U1 with thyristors T1 and contactors 51, S2, in addition to the second control board U2 with the frequency converter FC. Power is then shifted from the motor M2 over to the motor M1—high or medium speed. A frequency converter is a standard component, and it will be simple for a person skilled in the art to make the selection of type and brand of frequency converter.

Figure 4:
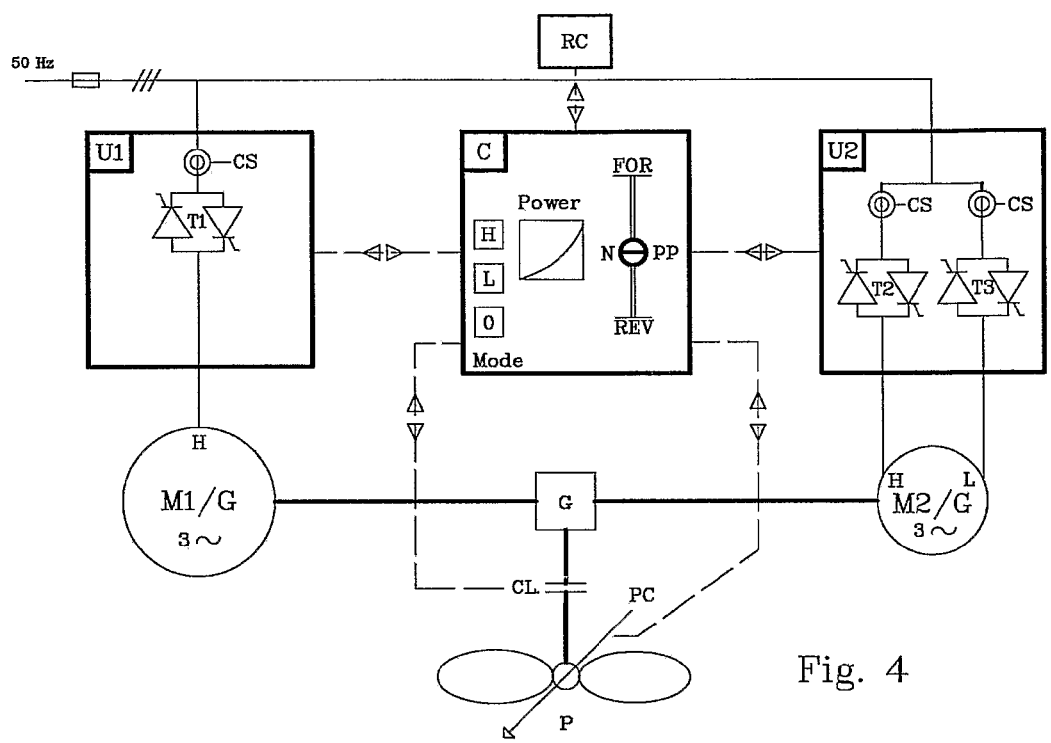
FIG. 4 is a principle drawing showing a fourth embodiment of the system according to the present invention.

In FIG. 4, a fourth possible embodiment according to the present invention is illustrated. This embodiment is quite similar to the one showed in FIG. 1, with the exception of the motors M1, M2. The large motor M1 has a high rotational speed H, while the small motor M2 has the two rotational speeds H and L. Here, also the second motor M2 works as an assistant motor to help the first motor M1 to reach a high rotational speed H. The control panel C has, as a result of the rotational speed of the motors M1, M2, three command buttons 0, L, H for selection of mode. The transition between the different rotational speeds is as described for FIG. 1.

Figure 5:
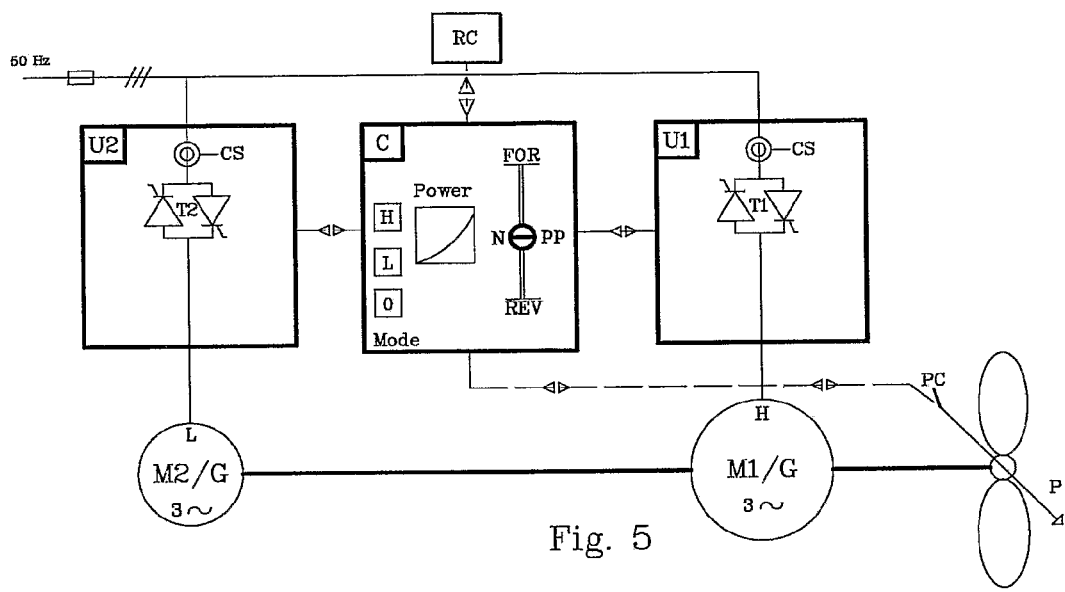
FIG. 5 is a principle drawing showing a possible alternative placing of the motors or generators in all embodiments.

In FIGS. 1-4 and 6, the first motor M1 is shown to be mechanically connected, via a shaft, to a gear G, and the second motor M2 is also mechanically connected, via a shaft, to the same gear G. An alternative simplified configuration is to connect the second motor M2 to the first motor M1 via a shaft, and not via the gear G, such that the first motor M1 has two shafts. Such a possible configuration is shown in FIG. 5. The motors M1, M2 in FIG. 5 are one-speed motors, i.e. the motor M1 has the rotational speed H and the motor M2 has rotational speed L. This is also reflected in the control system C where there are only three selectable modes 0, L, H. This solution is only a mechanical change compared to the other embodiments which makes it mechanically easier for the gear G, but it does not give any change regarding control. The embodiment shown in FIG. 5 is also simplified by that absence of the gear G and the clutch CL, as in the other embodiments. This simplified configuration shown in FIG. 5 can be used as an alternative and simplified configuration in all embodiments shown in FIGS. 1-4 and 6.

Figure 6:
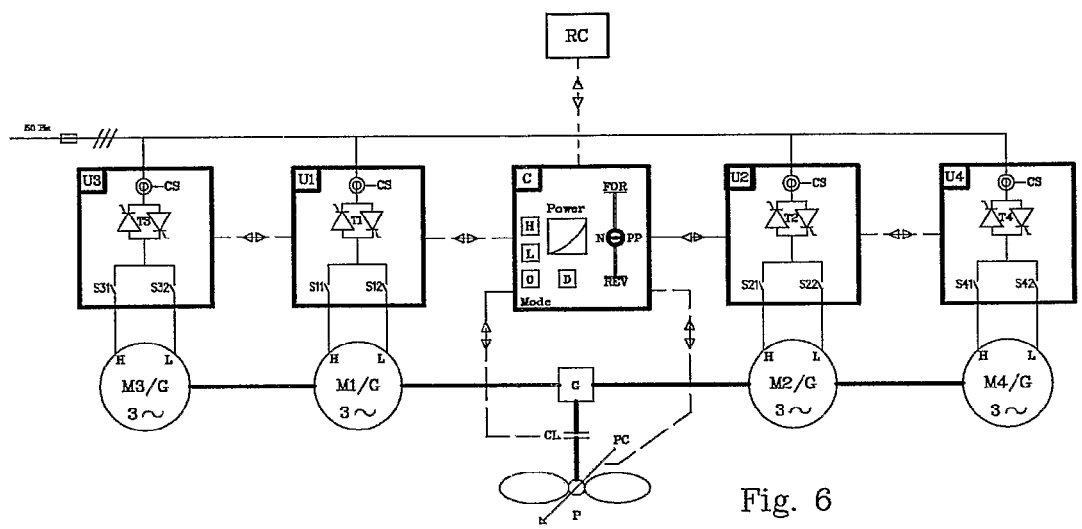
FIG. 6 is a principle drawing showing a fifth embodiment of the system according to the present invention.

FIG. 6 shows a fifth embodiment of the present invention. As shown in the figure, this embodiment comprises four motors M1, M2, M3, M4, instead of two motors as in the previously described embodiments. The four motors M1, M2, M3, M4 are two-speed motors with similar characteristics. Even one and three-speeds in each motor can be used. The motors M1, M2, M3, M4 are in FIG. 6 shown with the two rotational speeds high and low, H, L, but also other rotational speed selections are possible. Control boards U1, U2, U3, U4 are connected to and controlling the motors M1, M2, M3, M4. All these control boards U1, U2, U3, U4 have equivalent structures and functions. These four control boards U1, U2, U3, U4 have each a set of anti-parallel connected thyristors T1, T2, T3, T4, a sensor CS and two contactors S11 and S12, S21 and S22, S31 and S32, S41 and S42. The control boards U1, U2, U3, U4 should have similar structures and functions, but instead of the described structure, they can for example (not shown) have two sets of anti-parallel connected thyristors and two sensors. A control system C controls the control boards U1, U2, U3, U4. The stepless control of power and rotational speed in the embodiment in FIG. 6 takes place in the same way as described for the previous embodiments. In FIG. 6, the system comprises four motors, but all numbers between two and ten equal parallel motors can be used. In the control system C in FIG. 6, a switch and indicator D is added, which is not present in the other embodiments. The switch/indicator D has a dynamic function which, at activation from the user, connects from one to four of the motors M1, M2, M3, M4, dependent on how much power one takes out on the process machine P. The embodiment shown in FIG. 6 is primarily used if there is a need for large powers to the process machine P distributed on several drive motors.

A not shown alternative of the configuration shown in FIG. 6 is to add a fifth motor in addition to the four motors M1, M2, M3, M4. This fifth additional motor will be a small frequency controlled motor, as shown in FIG. 3.

Figure 7:
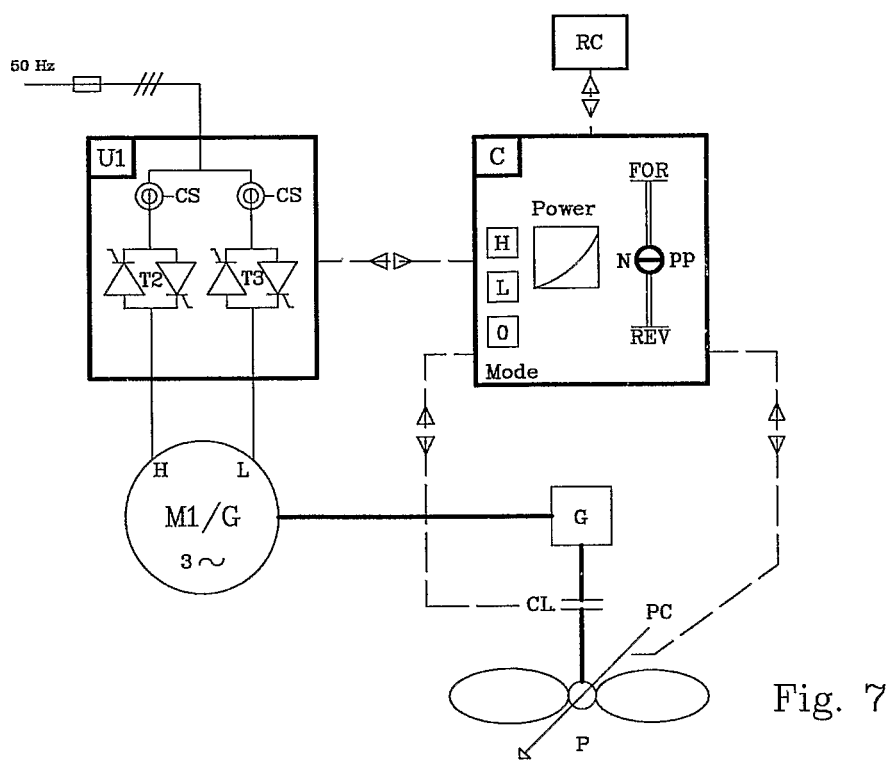
FIG. 7 is a principle drawing showing a sixth embodiment of the system according to the present invention.

FIG. 7 shows a sixth embodiment of the invention where the system comprises only one single motor M1. The motor M1 is a two-speed motor with the two rotational speeds high and low, H, L. Three- or four-speed motors can also be used. Accordingly, the control board U1 must also be expanded. As in the previously described embodiments, the motor M1 is also controlled by a control board U1. The control board U1 comprises two sensors CS and two sets of anti-parallel connected thyristors T2, T3. An alternative structure (not shown) of the control board U1 can be that it contains a sensor CS, a set of anti-parallel connected thyristors and two contactors. The control board U1 is controlled by a control system C with the same structure and function as previously described. As the motor M1 has the two rotational speeds H, L, there are only three command buttons in the control system C giving the selections between mode 0, L and H. In these embodiments, the thyristors T2, T3 alone creates all acceleration of the motor M1, and are in charge of the operation of the system, as opposed to the other embodiments where a pony motor is used. This system shown in FIG. 7 provides a larger load on the grid and requires a stronger grid than the previous alternatives.

Figure 8:
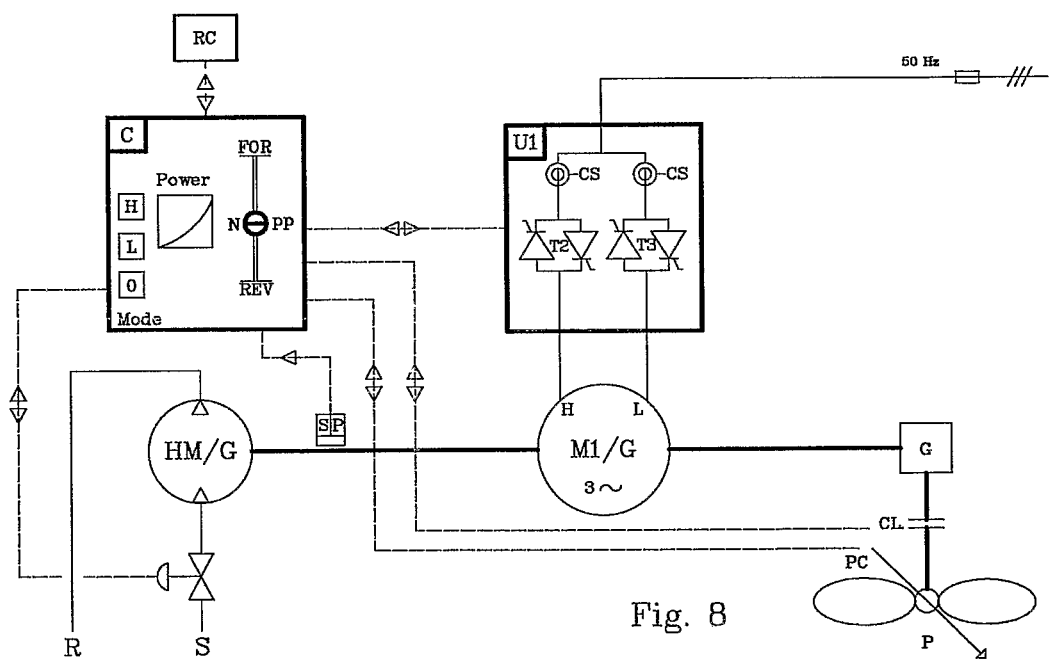
FIG. 8 is a principle drawing showing a seventh embodiment of the system according to the present invention.

FIG. 8 shows a seventh embodiment of the invention, and is a variant of the embodiment shown in FIG. 3. Instead of the frequency converter FC in FIG. 3, the system has a non-electric motor/turbine HM in the seventh embodiment. This non-electric motor/turbine HM is typically hydraulic or air operated, but also other types of non-electric motors/turbines can be used. The non-electric motor/turbine HM is operated by a separate power supply S. The non-electric motor/turbine HM needs, because it is not electric, a rotational speed sensor SP measuring its work. The rotational speed sensor SP provides electric monitoring of the non-electric motor/turbine HM. The non-electric motor/turbine HM is controlled so that it is possible to go from rotational speed 0 to L and from 0 to H, and it can also be used to run the whole system with reduced performance. Return R is an amount of operating medium returning from the non-electric motor/turbine, and can be recycled back to the power supply S via for example a pump.

The motor M1 is a two-speed motor or generator with the rotational speeds H and L, and is controlled by a control board U1 containing two sets of anti-parallel connected thyristors T2, T2 each being connected to a sensor CS. The control system C controls the control board U1, the motor M1 and the motor/turbine HM in the same way as described for the other embodiments above. The motor M1 can in principle have from one to four speeds.

The components used in the system according to the present invention are available off-the self components, and a person skilled in the art will understand which type and brand of the various components which will be preferred. An exception is the software connected to the control system C, which is not standard software.

The invention claimed is:

1. A system for control of rotational speed and power, the system comprising:
    at least one motor or generator;
    a control system, connected to and arranged to control a first control board, the first control board being connected to and arranged to control the at least one motor or generator;
    wherein a rotating process machine rotates with a rotational speed given by the at least one motor or generator;
    wherein the at least one motor or generator is connected to the control system and the rotational speed of the at least one motor or generator is controlled by the control system; and
    wherein the rotating process machine comprises:
    an adjustable load control, wherein the control system is connected to the rotating process machine and controls the adjustable load control in the rotating process machine to achieve soft transitions between several selectable rotational speeds and lower energy consumption by step by step adjusting a size and rotational speed of the at least one motor or generator to varying energy requirements.

2. The system according to claim 1, wherein the first control board comprises at least one set of thyristors and at least one sensor.

3. The system according to claim 2, wherein the first control board comprises at least two contactors.

4. The system according to claim 2, wherein the first control board comprises at least two sets of thyristors and at least two sensors.

5. The system according to claim 4, wherein the at least one set of thyristors and the at least two sets of thyristors are 3-phase anti-parallel connected thyristors or equivalent power semi-conductors.

6. The system according to claim 1, wherein the first control board comprises at least one frequency converter and at least one sensor.

7. The system according to claim 1, comprising an external power supply with a frequency of approximately 50 Hz.

8. The system according to claim 1, wherein the rotating process machine comprises a power larger than approximately 100 kW.

9. The system according to claim 1, comprising at least one clutch.

10. The system according to claim 1, wherein: the rotating process machine is connected to a gear; and the gear is connected to the at least one motor or generator.

11. The system according to claim 1, comprising a remote control system.

12. A system for control of rotational speed and power, the system comprising:
- a first motor or generator;
- a second motor or generator interconnected to the first motor or generator via a shaft;
- a control system connected to the first motor or generator and the second motor or generator;
- wherein a rotating process machine rotates with a rotational speed given by at least one of the first motor or generator and the second motor or generator;
- wherein the rotational speed of the first motor or generator and the second motor or generator is controlled by the control system;
- wherein the rotating process machine comprises:
- an adjustable load control arranged to be adjusted, wherein the control system is connected to the rotating process machine and controls the adjustable load control in the rotating process machine to achieve soft transitions between several selectable rotational speeds and lower energy consumption by step by step adjusting a size and rotational speed of the first motor or generator and the second motor or generator to varying energy requirements; and
- wherein the second motor or generator is arranged to assist the first motor or generator to reach high rotational speeds.

13. The system according to claim 12, wherein the first motor or generator and the second motor or generator are connected to and arranged to be controlled by a first control board and a second control board, respectively.

14. The system according to claim 12, wherein the first motor or generator rotates at at least one first speed and the second motor or generator rotates at at least one second speed.

15. The system according to claim 12, wherein the first motor or generator comprises a power between approximately three and approximately ten times larger than a power of the second motor or generator.

16. The system according to claim 12, wherein:
the rotating process machine is connected to a gear; and
the gear is connected to the first motor or generator and the second motor or generator.

17. A system for control of rotational speed and power, the system comprising:
- at least one motor or generator;
- a non-electric motor connected to the at least one motor or generator via a shaft;
- a control system connected to the at least one motor or generator;
- wherein a rotating process machine rotates with a rotational speed given by the at least one motor or generator;
- wherein the rotational speed of the at least one motor or generator is controlled by the control system; and
- wherein the rotating process machine comprises:
- an adjustable load control, wherein the control system is connected to the rotating process machine and controls the adjustable load control in the rotating process machine to achieve soft transitions between several selectable rotational speeds and lower energy consumption by step by step adjusting a size and rotational speed of the at least one motor or generator to varying energy requirements; and
- wherein the non-electric motor is controlled by the control system.

18. The system according to claim 17, wherein the non-electric motor is operated by a power supply.

19. The system according to claim 17, wherein the non-electric motor is connected to a rotational speed sensor.

* * * * *

UNITED STATES PATENT AND TRADEMARK OFFICE
CERTIFICATE OF CORRECTION

PATENT NO. : 8,648,553 B2
APPLICATION NO. : 12/738961
DATED : February 11, 2014
INVENTOR(S) : Hallvard Slettevoll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-ninth Day of September, 2015

Michelle K. Lee
*Director of the United States Patent and Trademark Office*